United States Patent [19]
Read

[11] Patent Number: 4,881,187
[45] Date of Patent: Nov. 14, 1989

[54] CYCLE COMPUTER WITH IMPROVED SWITCH AND PUSH-BUTTON ARRANGEMENT TO FACILITATE RESETTING

[75] Inventor: Robert Read, Bartlett, Ill.

[73] Assignee: Schwinn Bicycle Company, Chicago, Ill.

[21] Appl. No.: 346,337

[22] Filed: Apr. 27, 1989

Related U.S. Application Data

[63] Continuation of Ser. No. 160,406, Feb. 25, 1988, abandoned.

[51] Int. Cl.$^4$ ............... G01P 3/48; G01P 3/54; G01C 22/00
[52] U.S. Cl. .................. 364/565; 364/561; 340/432; 368/10; 377/24.2; 434/61; 200/5 D
[58] Field of Search ............ 364/561, 565, 709.1, 364/709.2, 709.12, 709.13, 709.15; 340/134, 323 R; 324/166, 174, 180; 368/10, 69, 70; 377/20, 24, 24.1, 24.2; 200/5 R, 5 D, 5 E, 175; 434/61

[56] References Cited

U.S. PATENT DOCUMENTS

| | | | |
|---|---|---|---|
| 4,071,892 | 1/1978 | Genzling | 364/443 |
| 4,334,190 | 6/1982 | Sochaczevski | 364/565 |
| 4,387,437 | 6/1983 | Lowrey et al. | 364/565 |
| 4,499,342 | 2/1985 | Nakayama | 200/5 E |
| 4,508,944 | 4/1985 | Yashima et al. | 200/5 E |
| 4,510,485 | 4/1985 | Tahara | 340/323 R |
| 4,578,769 | 3/1986 | Frederick | 364/561 |
| 4,633,216 | 12/1986 | Isuyama | 340/134 |
| 4,636,769 | 1/1987 | Tsuyama | 340/134 |
| 4,638,448 | 1/1987 | Cuvelier et al. | 364/710.12 |
| 4,642,606 | 2/1987 | Tsuyama | 340/134 |
| 4,654,488 | 3/1987 | Westfall | 200/5 R |
| 4,740,905 | 4/1988 | Murakami et al. | 364/561 |
| 4,741,001 | 4/1988 | Ma | 364/561 |

Primary Examiner—Parshotam S. Lall
Assistant Examiner—Brian M. Mattson
Attorney, Agent, or Firm—McCaleb, Lucas & Brugman

[57] ABSTRACT

A cycle computer has a pair of push-buttons connected respectively to a mode switch and to an on/off switch. Sequential actuation of the mode switch places the computer selectively in one of a plurality of Modes including a "stop watch" mode. Alternate actuation of the on/off switch, while in the stop watch mode, turns the stop watch function on and off. Simultaneous depression of both push-buttons, while the computer is in stop watch mode, resets the stop watch mode and at least two other modes. To facilitate resetting under poor visibility conditions, or when it would be unsafe to divert the rider's attention from the road or other traffic, the push-buttons abut along a common line and have a shared recess straddling that line which can be located by feel alone, enabling the push-buttons to be depressed simultaneously with one thumb while both rider's hands safely grip the handlebar.

3 Claims, 2 Drawing Sheets

CYCLE COMPUTER WITH IMPROVED SWITCH AND PUSH-BUTTON ARRANGEMENT TO FACILITATE RESETTING

This is a continuation of co-pending application Ser. No. 07/160,406 filed on 2/25/88 now abandoned.

BACKGROUND OF THE INVENTION

In the past, readouts of instantaneous speed and elapsed mileage for bicycles have been possible with mechanically driven speedometers using a gear-driven worm on one of the wheels. Drag, noise, wear and limited readout information have been cause for complaints.

More recently, electronic cycle computers have replaced these old mechanically driven speedometers. They have a central computer, a clock, a liquid crystal display, and can gather and display a wide variety of information through a frictionless non-mechanical interface between the bicycle or rider and the computer itself. Typically, there are one or more magnets on one of the wheels and possibly on the crank arm, and a sensor coil or reed switch attached to the frame.

These new electronic cycle computers have basic speedometer capabilities including current speed and resettable trip and total distance displays. Generally, they have a built-in stop watch enabling a rider to calculate average speed at the end of a ride, although some have an average speed function which does this automatically. Others display additional information such as maximum speed, pedaling cadence, and even heart beat rate which is increasingly recognized as an important parameter for training racers and for those who ride for health and fitness.

At least four user categories are developing for these cycle computers: the serious, competitive, professional or non-competitive racing cyclist; the tourer, who may ride 100 miles or more a day; the casual cyclist; and children.

These are, of course, used while riding a bicycle. Use, setting and resetting must not require the rider to remove his or her hand from the handlebar or divert attention from the road or from traffic especially at those times when visibility is impaired by riding directly into the rising or setting sun; or by smoke, fog, haze or darkness. Conventional cycle computers require the rider to divert attention from the road and other traffic to the computer face, to remove one hand from the handlebar and use the index finger to activate the mode selection and control buttons. With only one hand on the handlebar, steering control can be dangerously reduced. To visually find the computer and locate the appropriate mode and control buttons, attention can be dangerously diverted from the road and traffic.

SUMMARY OF THE INVENTION

Accordingly, it is a general object of the present invention to provide a cycle computer which the rider can readily locate while riding and reset it by one thumb while gripping the handlebar with both hands, and without diverting his or her attention from the road or from traffic.

A particular object of the present invention is to provide an improved push-button arrangement capable of being located, operated, and reset by feel alone.

Another object is to provide such a cycle computer having a mode switch effective when sequentially actuated to place the computer successively in any one of a plurality of modes, and an on/off switch effective when alternately actuated to turn at least one of the modes on and off, the two switches being effective when simultaneously actuated to reset at least some of the modes to zero.

Another object is to provide such a cycle computer in which the control switches are actuatable by large push buttons which abut one another along a common line, and the push-buttons have a shared recess straddling that line to enable adjacent surfaces of the push-buttons to be located by feel alone prior to simultaneous depression of both push-buttons.

BRIEF DESCRIPTION OF THE DRAWINGS

Like parts are referred to by like reference characters throughout the figures.

DESCRIPTION OF THE PREFERRED EMBODIMENT

Figure 2:
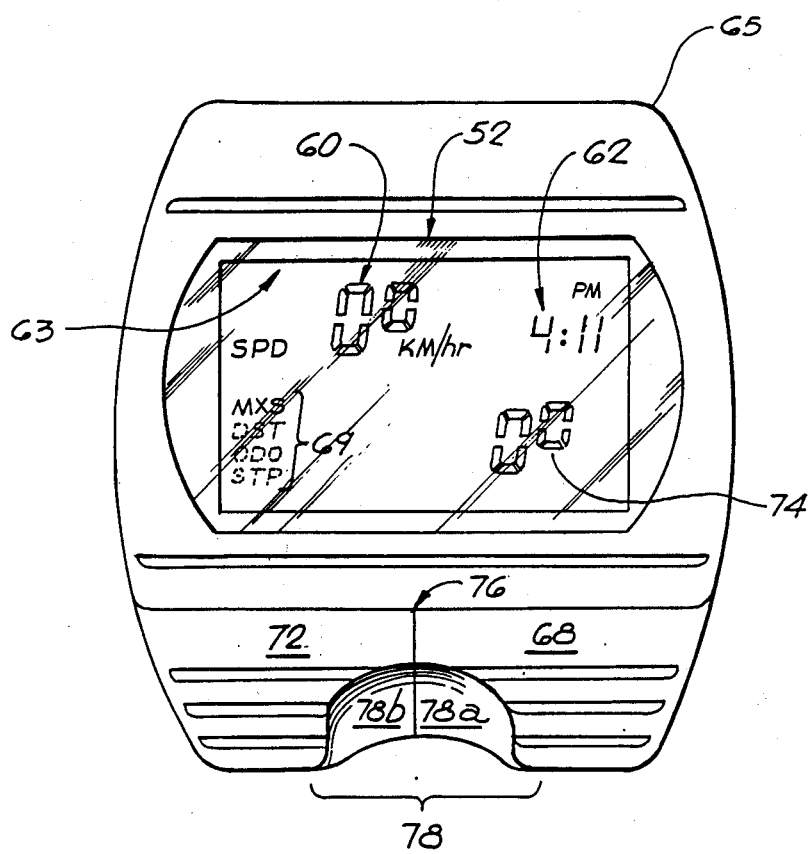
FIG. 2 is an enlarged front view of the cycle computer shown in FIG. 1.
Figure 1:
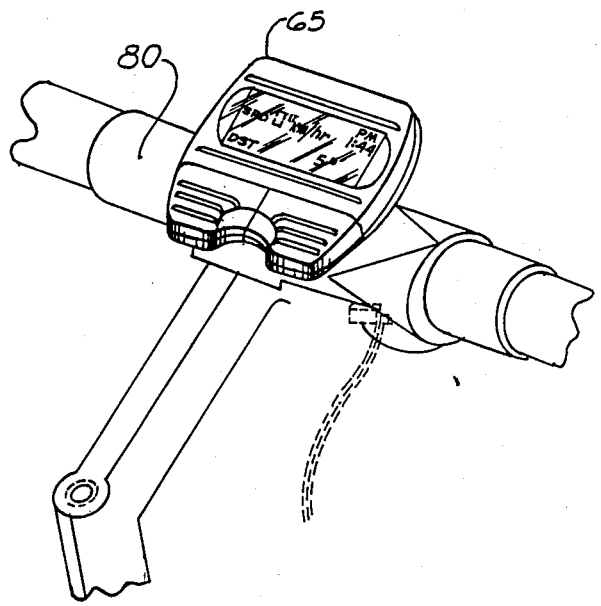
FIG. 1 is a perspective view of a cycle computer with a push-button arrangement according to the present invention and clamped to a bicycle handlebar which is fragmentarily shown.
Figure 3:
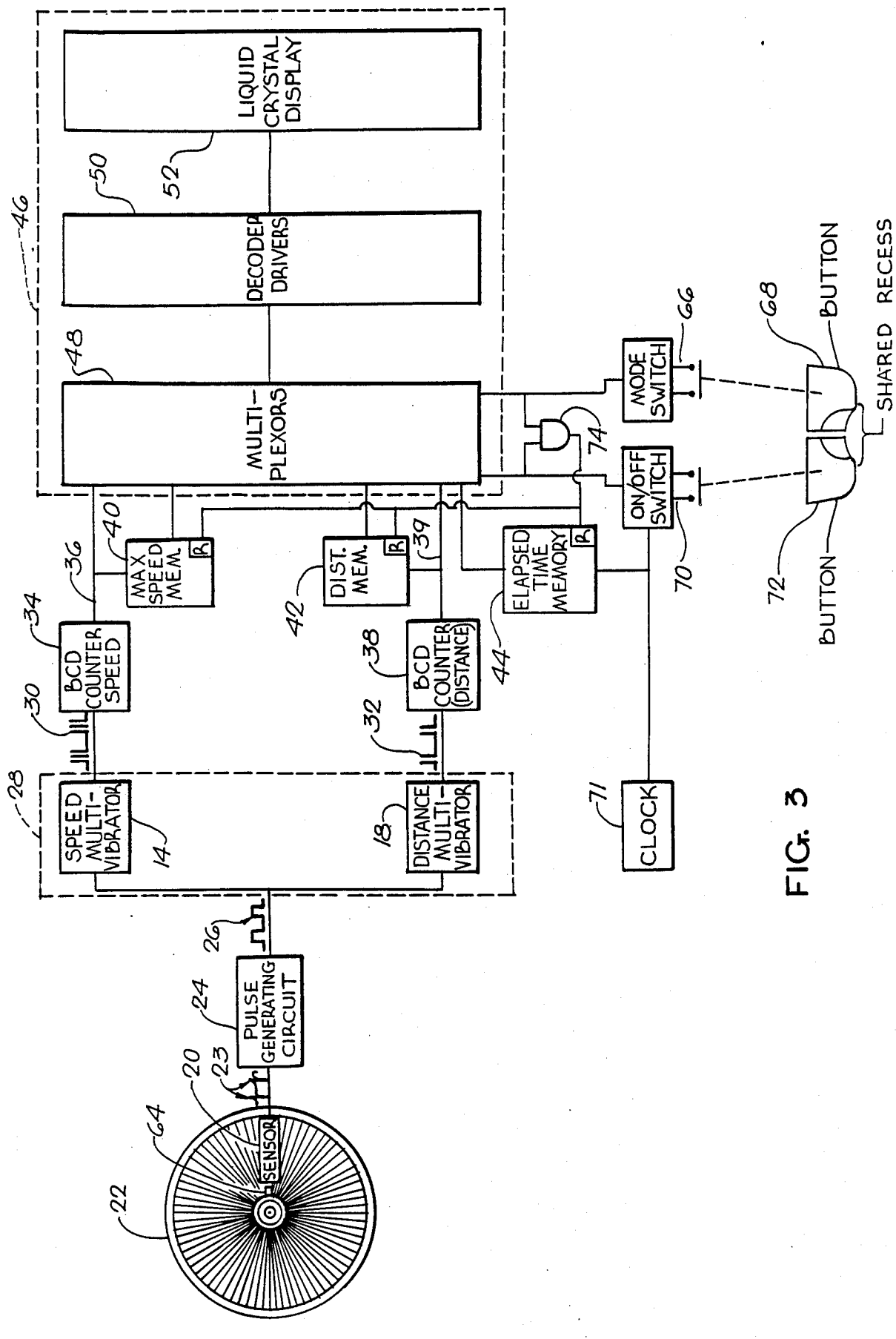
FIG. 3 is a block diagram, generally illustrating the principal electronic components of the cycle computer in accordance with the present invention.

Referring now in more detail to the drawings, the invention is concerned primarily with the push-button arrangement shown in FIGS. 1 and 2 and with the control switch arrangement shown in FIG. 3. The block diagram of FIG. 3 illustrates in a general way only one example of an electronic control circuit which may be used with this invention.

Referring first to the block diagram in FIG. 3, this illustrates the principal components of a representative speedometer/odometer which may be controlled by the push-button arrangement of the present invention.

The system shown in FIG. 3 includes a speed pick-up sensor or reed switch 20 for generating voltage spikes 23 as a wheel 22 rotates; a pulse-generating circuit 24 for converting these spikes into a voltage signal having uniform square wave voltage pulses 26; a signal generator 28 for generating a speed-indicating signal 30 and a distance-indicating signal 32 synchronized with pulses 26; a binary-coded decimal counter 34 for counting the cycles of the speed signal 30 and for developing an output signal on line 36; a binary-coded decimal counter 38 for counting the cycles of the distance signal 32 and for developing an output signal on line 39; memory registers 40, 42 and 44 for storing maximum speed, distance traveled, and elapsed time, respectively; and a display circuit 46.

The display circuit 46 includes a set of multiplexers 48 for outputting binary-coded decimal information from either counter 34 or 38, a set of decoder drivers 50 for converting the binary-coded information from multiplexers 48 into decimal information, and a liquid crystal display (LCD) 52 which may be a constant display of current speed and time of day at locations 60 and 62 in the display window 63 of computer casing 65 as shown in FIG. 2. Sensor 20 develops voltage signals 23 from magnet or magnets 64 as they rotate with the wheel. These signals have a frequency proportional to vehicle speed. As an individual magnet 64 approaches and leaves the sensor 20, the magnetic flux of the magnet causes voltage spikes 23 to develop at the sensor output. These voltage spikes are fed into the pulse generating circuit 24.

A mode switch 66 is connected via multiplexers 48 and decoder drivers 50 into the liquid crystal display 52. Mode switch 66 is operatively connected to and actuated by mode push-button 68. Sequential operation of the mode switch by push-button 68 places the computer successively in the following plurality of modes as shown in the display window 63 in FIG. 2:

(a) maximum speed ("MXS")
(b) distance traveled ("DST")
(c) odometer ("ODO")
(d) stop watch ("STP")

As will be explained, the mode in use at any one particular time will be displayed at location 69 in window 63. An optional mode not shown in the particular computer illustrated may be pedal cadence. The maximum speed "MXS" is indicated in solid lines.

An on/off switch 70 has an input from clock 71 and is connected via multiplexers 48 and decoder drivers 50 into the liquid crystal display 52 which is seen through the display window 63. On/off switch 70 is operatively connected to and actuated by on/off push-button 72. When the computer is in stop watch mode as called up by mode push-button 68, alternate operation of the on/off switch 70 by push-button 72 turns the stop watch display on and off at location 74 in the display window 63.

An important feature of the present invention is that simultaneous actuation of on/off switch 70 and mode switch 66 for a period of two seconds, while in stop watch mode, resets a plurality of the modes to zero. In the present case the resettable modes are the maximum speed, distance traveled, and stop watch modes as represented by memory circuits 40, 42 and 44. As shown in FIG. 3, simultaneous actuation of switches 66 and 70 inputs two signals into AND gate 74 directing output signals to the reset portions R of each of the memory circuits 40, 42 and 44.

Another important feature of this invention is the configuration and proximity of the two push-buttons 68 and 72 enabling a rider to reset the computer by one thumb while gripping the handlebar with both hands and without diverting his or her attention from the road or from traffic.

Referring to FIG. 2, the mode push-button 68 and the on/off push-button 72 are relatively large and in close side-by-side proximity to one another. These push-buttons 68 and 72 abut one another along a common line 76 and have a shared recess 78 comprising matching concavities or half recesses 78a and 78b in push-buttons 68 and 72, respectively. In use, the computer will be clamped at a central position atop a bicycle handlebar 80 as shown in FIG. 1. Successive depressions of the mode push-button 68 will select one of the four modes described above and display it at location 69 in window 63.

As the bicycle is ridden, the current speed will be displayed at 60 and the elapsed distance will be displayed at 74 when the "ODO" mode is called up by mode push-button 68. Alternatively, the elapsed distance will be recorded in the trip distance ("DST") mode if the stop watch is running to enable a precise measurement of distance per unit time during a timed run.

The maximum speed ("MXS"), trip distance ("DST") and stop watch ("STP") modes are resettable simultaneously by first placing the computer in stop watch mode by depressing push-button 68 an appropriate number of times and then holding both buttons 68 and 72 depressed for two seconds.

Resetting while the bicycle is being ridden is greatly facilitated by the close, abutting proximity of the buttons along common line 76 and by the shared recess 78 which can be located by feel alone without the rider taking his or her eyes off the road or diverting attention from traffic.

The embodiment described and shown above to illustrate the present invention has been necessarily specific for purposes of illustration. Alterations, extensions, and modifications would be apparent to those skilled in the art. The aim of the appended claims, therefore, is to cover all variations included within the spirit and scope of the invention.

The embodiments of the invention in which an exclusive property or privilege is claimed are defined as follows:

1. In a cycle computer having a casing, an improved multiple switch control for a circuit within said casing comprising a pair of separate and independently movable manually depressible push-buttons located in side-by-side relation on said casing and abutting one another along a common line, one of said push-buttons being operatively connected to a control switch for said circuit and the other of said push-buttons being operatively connected to another control switch for said circuit, said push-buttons being simultaneously depressible by a single finger on push-button surfaces straddling said common line for simultaneously actuating said control switches, and the surfaces of said push-buttons having a shared recess straddling said common line enabling adjacent surfaces of said push-buttons to be located by feel alone prior to simultaneous depression of both push-buttons.

2. In a cycle computer having a casing, an improved multiple switch control for a circuit within said casing comprising a pair of separate and independently movable push-buttons located in side-by-side relation abutting one another along a common line, the surfaces of said push-buttons having adjacent half-recesses constituting a single shared recess straddling said common line enabling adjacent surfaces of said push-buttons to be located by feel alone to enable simultaneous depression of both push-buttons, said push-buttons being manually depressible simultaneously by single finger actuation applied to said shared recess, one of said push-buttons being operatively connected to a mode switch and the other of said push-buttons being operatively connected to an on/off switch, said mode switch being connectible into said circuit and effective when sequentially actuated to place said computer successively in a plurality of modes, and on/off switch being connectible into said circuit and effective when alternately actuated to turn at least one of said modes on or off.

3. In a cycle computer having a casing, an improved multiple switch control for a circuit within said casing comprising a pair of separate and independently movable manually depressible push-buttons located in side-by-side relation abutting one another along a common line, the surfaces of said push-buttons having adjacent recess portions constituting a single shared recess straddling said common line enabling adjacent surfaces of said push-buttons to be located by feel alone to facilitate simultaneous depression of both push-buttons, said push-buttons being respectively operatively connected to a pair of control switches for said circuit and being manually depressible simultaneously by single finger actuation applied to said shared recess to actuate said pair of control switches simultaneously.

* * * * *